United States Patent
Xu

(10) Patent No.: US 11,908,235 B2
(45) Date of Patent: Feb. 20, 2024

(54) METHOD AND DEVICE OF REGISTERING FACE BASED ON VIDEO DATA, AND ELECTRONIC WHITEBOARD

(71) Applicant: BOE TECHNOLOGY GROUP CO., LTD., Beijing (CN)

(72) Inventor: Jingtao Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 194 days.

(21) Appl. No.: 17/595,605

(22) PCT Filed: Dec. 25, 2020

(86) PCT No.: PCT/CN2020/139354
§ 371 (c)(1),
(2) Date: Nov. 19, 2021

(87) PCT Pub. No.: WO2022/133993
PCT Pub. Date: Jun. 30, 2022

(65) Prior Publication Data
US 2022/0398866 A1   Dec. 15, 2022

(51) Int. Cl.
*G06V 40/16* (2022.01)
*G06V 10/74* (2022.01)
(Continued)

(52) U.S. Cl.
CPC .......... *G06V 40/167* (2022.01); *G06V 10/22* (2022.01); *G06V 10/761* (2022.01); *G06V 20/41* (2022.01);
(Continued)

(58) Field of Classification Search
CPC .... G06V 40/167; G06V 10/22; G06V 10/761; G06V 20/41; G06V 20/48; G06V 40/168;
(Continued)

(56) References Cited

U.S. PATENT DOCUMENTS

2011/0135153 A1* 6/2011 Tsurumi .............. G06T 7/246
382/103
2020/0089937 A1* 3/2020 Tseng .................. G06V 40/172
(Continued)

FOREIGN PATENT DOCUMENTS

CN     105760817 A    7/2016
CN     108171207 A    6/2018
(Continued)

OTHER PUBLICATIONS

International Search Report and Written Opinion dated Sep. 27, 2021, for corresponding PCT Application No. PCT/CN2020/0139354.

*Primary Examiner* — Nimesh Patel
(74) *Attorney, Agent, or Firm* — Kinney & Lange, P.A.

(57) ABSTRACT

The embodiments of the present disclosure provide a method of registering a face based on video data, including: receiving video data; acquiring a first image frame sequence from the video data, wherein each image frame in the first image frame sequence includes a face detection frame containing a complete facial feature; determining whether each image frame reaches a preset definition or not according to a relative position of the face detection frame in the image frame; extracting a plurality of sets of facial features based on an image information of the plurality of face detection frames in response to determining that the image frame reaches the preset definition, and determining whether the faces represent an object or not according to the plurality of sets of facial features; and registering the object according to the first image frame sequence in response to determining that the faces represent the object.

13 Claims, 8 Drawing Sheets

(51) Int. Cl.
  *G06V 20/40* (2022.01)
  *G06V 10/22* (2022.01)
  *G06V 40/50* (2022.01)
  *G06V 40/40* (2022.01)
(52) U.S. Cl.
  CPC ............ G06V 20/48 (2022.01); G06V 40/168 (2022.01); G06V 40/45 (2022.01); G06V 40/50 (2022.01)
(58) Field of Classification Search
  CPC ...... G06V 40/45; G06V 40/50; G06V 40/173; G06V 40/161; G06V 40/172; G06V 40/171; G06V 20/46; G06V 10/82; G06V 40/165; G06V 40/166; G06V 40/174; G06V 20/40; G06V 40/20; G06V 20/52; G06V 40/10; G06V 40/16; G06V 40/175; G06V 10/16; G06V 10/245; G06V 10/764; G06V 40/169; G06V 40/176; G06V 40/23; G06V 40/25; G06V 40/40; G06V 40/193; G06V 20/44; G06V 20/49; G06V 40/28; G06V 40/103; G06V 10/25; G06V 10/255; G06V 20/64; G06V 40/18; G06V 10/449; G06V 10/774; G06V 10/507; G06V 10/24; G06V 10/20; G06V 10/7515; G06V 10/225; G06V 10/40; G06V 20/53; G06V 20/80; G06T 2207/30201; G06T 2207/10016; G06T 7/20; G06T 2207/30196; G06T 7/248; G06T 7/207; G06T 7/246; G06T 7/292; G06T 7/73; G06T 13/40; G06T 1/60; G06T 2207/10048; G06T 3/4046; G06T 7/00; G06T 7/0004; G06T 7/70; G06T 9/002; G06T 2207/20084; G06T 2207/20081; G06T 2207/30244; G06T 7/277; G06T 7/55; G06T 5/50; G06N 3/045; G06N 3/08; G06N 3/02; G06N 3/04; G06N 20/00; G06N 3/044; G06N 3/088; G06N 3/047; G06N 3/0464; G06N 3/082; G06N 20/10; G06F 18/214; G06F 18/00; G06F 18/22; G06F 18/241; G06F 18/2411; G06F 18/24; G06F 2212/455
  See application file for complete search history.

(56) References Cited

U.S. PATENT DOCUMENTS

| | | | |
|---|---|---|---|
| 2020/0125874 A1* | 4/2020 | Zhang | G06V 40/45 |
| 2020/0175279 A1* | 6/2020 | Chen | G06V 20/10 |
| 2020/0294250 A1* | 9/2020 | He | G06V 40/20 |
| 2020/0394392 A1* | 12/2020 | Wang | G06V 40/40 |
| 2021/0192185 A1* | 6/2021 | Lin | G06V 40/167 |

FOREIGN PATENT DOCUMENTS

| | | |
|---|---|---|
| CN | 110276277 A | 9/2019 |
| CN | 110705478 A | 1/2020 |
| KR | 102078249 B2 | 2/2020 |

* cited by examiner

METHOD AND DEVICE OF REGISTERING FACE BASED ON VIDEO DATA, AND ELECTRONIC WHITEBOARD

CROSS REFERENCE TO RELATED APPLICATION(S)

This application is a Section 371 National Stage Application of International Application No. PCT/CN2020/139354, filed on Dec. 25, 2020, which is incorporated herein by reference in its entirety.

TECHNICAL FIELD

The embodiments of the present disclosure relate to a field of face recognition, and in particular to a method and device of registering a face based on video data, and an electronic whiteboard.

BACKGROUND

With a gradual popularity of paperless meetings and paperless offices, electronic whiteboards are used more and more widely. An electronic whiteboard may receive content written on a board surface of the electronic whiteboard and transmit the content received to a computer, so as to conveniently record and store the content on the board surface of the whiteboard. In the use of the electronic whiteboard, in order to conveniently operate the electronic whiteboard at any distance, a function of locking the electronic whiteboard may not be set. Therefore, anyone may modify the content on the electronic whiteboard, which results in a problem of poor confidentiality during the use of the electronic whiteboard.

SUMMARY

The embodiments of the present disclosure provide a method and device of registering a face based on video data, and an electronic whiteboard.

According to a first aspect of the embodiments of the present disclosure, there is provided a method of registering a face based on video data, including: receiving video data; acquiring a first image frame sequence from the video data, wherein each image frame in the first image frame sequence includes a face detection frame containing a complete facial feature; determining, according to a relative position of the face detection frame in each image frame, whether the image frame reaches a preset definition or not; extracting a plurality of sets of facial features based on an image information of a plurality of face detection frames in response to determining that the image frame reaches the preset definition, and determining whether the faces represent an object or not according to the plurality of sets of facial features; and registering the object according to the first image frame sequence in response to determining that the faces represent the object.

In some embodiments, the acquiring a first image frame sequence from the video data includes: acquiring a plurality of image frames from the video data according to a sequence of capturing a video; determining whether the image frame contains a face or not based on a face detection model; and determining a face detection frame containing the face in each image frame of the plurality of image frames, in response to determining that the image frame contains the face.

In some embodiments, the acquiring a first image frame sequence from the video data further includes: determining whether the image frame acquired contains a complete facial feature or not; storing the image frame as a frame in the first image frame sequence in response to determining that the image frame contains the complete facial feature; and ending the acquiring of image frames in response to determining that a predetermined number of image frames are stored in the first image frame sequence.

In some embodiments, the determining whether the image frame acquired contains a complete facial feature or not includes: determining whether the face is a frontal face based on a face pose detection model; determining whether the face is occluded or not based on a face occlusion detection model in response to determining that the face contained in the image frame is the frontal face; determining that the image frame contains the complete facial feature, in response to determining that the face contained in the image frame is not occluded; and determining that the image frame does not contain the complete facial feature, in response to determining that the face contained in the image frame is occluded.

In some embodiments, the determining, according to a relative position of the face detection frame in each image frame, whether the image frame reaches a preset definition or not includes: determining a first ratio of an area of an intersection region of face detection frames in two image frames in the first image frame sequence to an area of a union region of the face detection frames in the two image frames; and determining that the image frame reaches the preset definition, in response to the first ratio determined being greater than a first threshold.

In some embodiments, the determining, according to a relative position of the face detection frame in each image frame, whether the image frame reaches a preset definition or not includes: determining a first ratio of an area of an intersection region of face detection frames in two image frames in the first image frame sequence to an area of a union region of the face detection frames in the two image frames; determining a second ratio of a number of the first ratio greater than the first threshold to a total number of the first ratio; and determining that the image frame reaches the preset definition, in response to the second ratio being greater than or equal to a second threshold.

In some embodiments, the determining whether the faces represent an object or not according to the plurality of sets of facial features includes: determining a similarity between facial features in any two adjacent image frames in the first image frame sequence; and determining that the faces represent the object, in response to the similarity determined being greater than a third threshold.

In some embodiments, the facial feature includes a facial feature vector, and the determining a similarity between facial features in any two adjacent image frames in the first image frame sequence includes: determining a distance between the facial feature vectors in the two adjacent image frames in the first image frame sequence.

In some embodiments, the registering the object according to the first image frame sequence includes: registering the object by using a designated image frame in the first image frame sequence as registration data.

In some embodiments, the method further includes: storing the registration data obtained by registering the object according to the first image frame sequence as a face database; and recognizing a face in the video data received, based on the face database.

In some embodiments, the recognizing a face in the video data received, based on the face database includes: acquiring a second image frame sequence from the video data received, wherein each image frame in the second image frame sequence includes a face detection frame containing a complete facial feature; determining, according to a relative position of the face detection frame in each image frame, whether the image frame contains a living face or not; extracting a facial feature based on the face detection frame in response to determining that the image frame contains the living face; and determining whether the facial feature matches the registration data in the face database or not, so as to recognize the face.

In some embodiments, the determining, according to a relative position of the face detection frame in each image frame, whether the image frame contains a living face or not includes: determining face detection frames meeting a coincidence condition of the plurality of face detection frames in each image frame; determining a third ratio of a number of the face detection frames meeting the coincidence condition to a total number of the plurality of face detection frames; determining that the face is a non-living face in response to the third ratio being greater than or equal to a fourth threshold; and determining that the face is a living face in response to the third ratio being less than the fourth threshold.

In some embodiments, the determining face detection frames meeting a coincidence condition of the plurality of face detection frames in each image frame includes: determining a fourth ratio of an area of an intersection region of any two face detection frames of the plurality of face detection frames to an area of each face detection frame of the two face detection frames; determining that the two face detection frames are the face detection frames meeting the coincidence condition, in response to the fourth ratios determined being both greater than a fifth threshold; and determining that the two face detection frames are not the face detection frames meeting the coincidence condition, in response to the fourth ratios determined being both less than the fifth threshold.

In some embodiments, the determining, according to a relative position of the face detection frame in each image frame, whether the image frame contains a living face or not further includes: determining that the face is a non-living face in response to one of the fourth ratios determined being greater than the fifth threshold and the other of the fourth ratios determined being less than or equal to the fifth threshold.

According to a second aspect of the embodiments of the present disclosure, there is provided a device of registering a face based on video data, including: a memory configured to store instructions; and a processor configured to execute the instructions so as to perform the method provided according to the first aspect of the embodiments of the present disclosure.

According to a third aspect of the embodiments of the present disclosure, there is provided an electronic whiteboard including the device provided according to the second aspect of the embodiments of the present disclosure.

The method of registering the face based on the video data according to the embodiments of the present disclosure may be implemented to register the face without a complex interaction in a registration process, which simplifies steps of a registration operation, shortens a registration time, and improves user experience.

BRIEF DESCRIPTION OF THE DRAWINGS

In order to more clearly illustrate the technical solutions in the embodiments of the present disclosure, the drawings required in the description of the embodiments of the present disclosure are briefly introduced below. The drawings in the following description illustrate only some embodiments of the present disclosure. For those of ordinary skilled in the art, further embodiments within the scope of the present disclosure may be obtained from these drawings without carrying out any inventive effort.

DETAILED DESCRIPTION OF EMBODIMENTS

Figure 1:
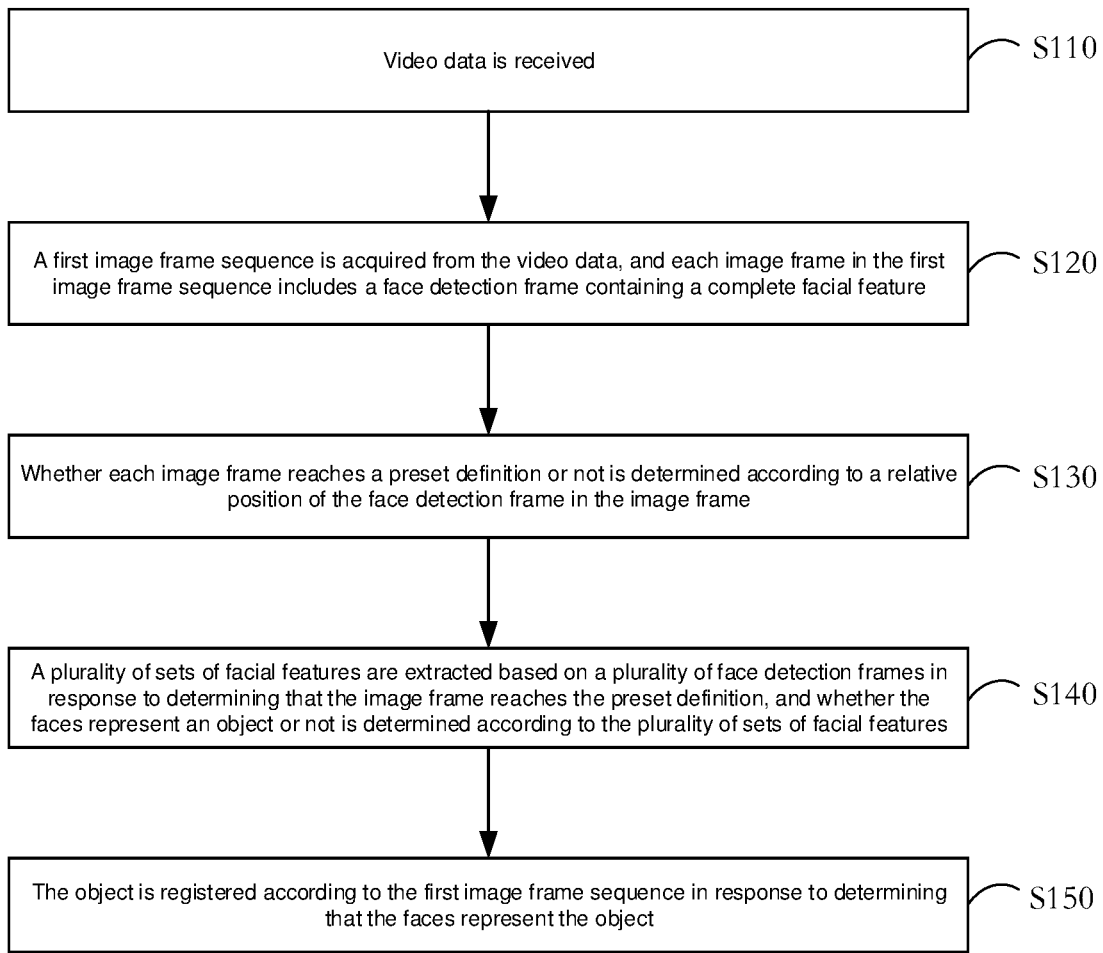
FIG. 1 shows a flowchart of a method of registering a face based on video data according to some embodiments of the present disclosure.

In order to make objectives, technical solutions, and advantages in the embodiments of the present disclosure more clear, the technical solutions in the embodiments of the present disclosure are clearly and completely described below with reference to the drawings of the embodiments of the present disclosure. The embodiments described in detail hereinafter make up only a subset of the embodiments contemplated in view of the present disclosure. Based on the embodiments of the present disclosure, all other embodiments obtained by those of ordinary skilled in the art without carrying out inventive effort also fall within the protection scope of the present disclosure. It should be noted that throughout the drawings, the same elements are indicated by the same or similar reference signs. In the following description, some specific embodiments are provided as illustrative examples for descriptive purposes, and should not be construed as limiting the present disclosure. When it may cause confusion in the understanding of the present disclosure, conventional structures or configurations may be omitted. It should be noted that the shapes and dimensions of components in the drawings do not necessarily reflect actual sizes and/or ratios, but merely illustrate the content of the embodiments of the present disclosure.

Unless otherwise defined, the technical or scientific terms used in the embodiments of the present disclosure should have the usual meanings understood by those skilled in the art. The words "first," "second," and the like used in the embodiments of the present disclosure do not indicate any order, quantity or importance, but are only used to distinguish different composition parts.

FIG. 1 shows a flowchart of a method 100 of registering a face based on video data according to some embodiments of the present disclosure. As shown in FIG. 1, the method 100 of registering the face based on the video data may include following steps.

In step S110, the video data is received.

In step S120, a first image frame sequence is acquired from the video data. Each image frame in the first image frame sequence may include a face detection frame containing a complete facial feature.

In step S130, whether each image frame reaches a preset definition or not is determined according to a relative position of the face detection frame in the image frame.

In step S140, a plurality of sets of facial features are extracted based on an image information of a plurality of face detection frames in response to determining that the image frame reaches the preset definition, and whether the faces represent an object or not is determined according to the plurality of sets of facial features.

In step S150, the object is registered according to the first image frame sequence in response to determining that the faces represent the object.

According to some embodiments, in step S110, the video data of the object may be captured by a video capture device such as a camera. In other embodiments, the video data of the object may be captured by a camera with a function of taking pictures at a regular time. Any video capture device or image capture device that may acquire continuous image frames is available. In addition, in the embodiments of the present disclosure, a format of the video data is not limited.

According to the embodiments, in step S120, after the video data is received, the first image frame sequence is acquired from the video data. Each image frame in the first image frame sequence includes a face detection frame containing a complete facial feature. An image frame that does not include a face detection frame containing a complete facial feature may not be used in a process of registering the face.

According to the embodiments, if the video capture device captures a plurality of objects in an image frame, an object may be selected according to a preset rule. By selecting the registered object, it is ensured that only one object is registered. According to the embodiments, a plurality of image frames are acquired from the video data in a sequence of capturing the video, and whether the image frame contains a face or not is determined based on a face detection model. In response to determining that the image frame contains the face, the face detection frame in each image frame of the plurality of image frames is determined. The embodiments of the present disclosure do not limit the face detection model used herein. Any face detection model may be used, or a special detection model may be built through model training. Parameters of the face detection frame may be in a form of a quaternary array, which respectively record coordinates of a reference point of the face detection frame and two side lengths of the face detection frame, so as to determine a position and a size of the face detection frame (or the face). According to the embodiments, a process of selecting the registered object may include: determining a face detection frame containing a face of each object in the image frame, comparing an area of a region enclosed by each face detection frame, then selecting the face detection frame enclosing a region with a largest area, and determining the face contained in the face detection frame as the registered object. In other embodiments of the present disclosure, a video capture window may be provided through a Graphical User Interface (GUI) when the video capture device captures a video, so as to prompt the object to place the face in the video capture window to capture a video.

According to the embodiments, in step S130, an action behavior of the object in the plurality of image frames sequentially arranged in the first image frame sequence is determined by analyzing a relative position between the face detection frames. For example, whether the object is moving or not, a direction of a motion, and a range of the motion may be determined. If the range of the motion of the object is too large, the image frame captured by the video capture device may be blurry. A blurry image frame may neither be used for authentication during a registration process, nor be stored as final registration data of the object. Therefore, in the embodiments of the present disclosure, by determining whether the motion of the face is within a predetermined range by analyzing the relative position between the face detection frames, it may be determined whether the captured image frame reaches a preset definition or not.

According to the embodiments, in step S140, if it is determined that the motion of the face is within the predetermined range, that is, the image frame reaches the preset definition, whether the face in each image frame belongs to an object or not may be further determined based on the image frame. According to the embodiments, a plurality of sets of facial features may be extracted by using a facial feature extraction model, and the facial feature extracted is a feature vector with a dimension.

According to the embodiments, in step S150, when it is ensured that a clear image frame containing a complete facial feature is used for registration and authentication, and the faces in each image frame belong to the same object, a designated image frame in the first image frame sequence may be stored as registration data of the object.

According to the embodiments of the present disclosure, the registration and authentication process may be performed only by analyzing the received video data, and the registered object is not required to cooperate with interactive methods such as blinking and opening mouth, so that the registration and authentication process may be greatly simplified.

Figure 2:
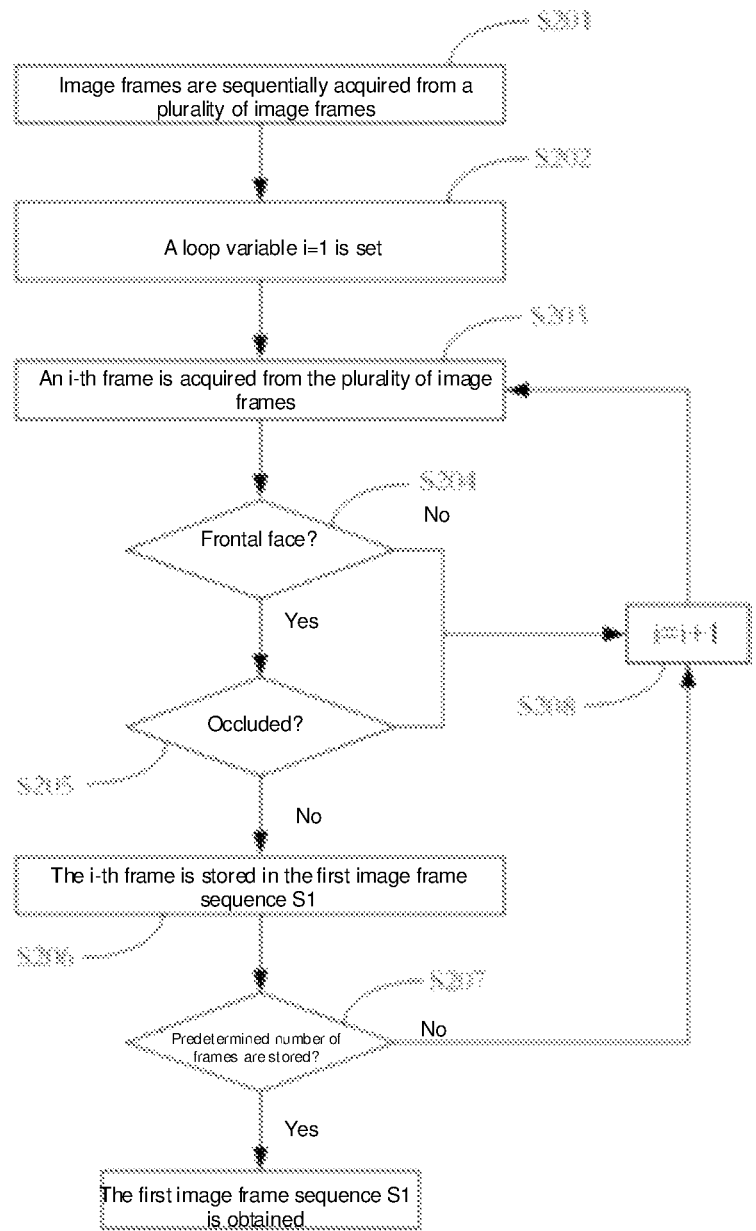
FIG. 2 shows a process of acquiring a first image frame sequence from the video data according to some embodiments of the present disclosure.

FIG. 2 shows a process of acquiring the first image frame sequence from the video data according to some embodiments of the present disclosure. As shown in FIG. 2, in step S201, image frames are sequentially acquired from a plurality of image frames. The plurality of image frames are continuous image frames acquired from the video data in a sequence of capturing the video. The image frame sequence extracted may be temporarily stored in a cache.

Next, in step S202, a parameter for extracting the first image frame sequence may be set, which may include setting a loop variable i with an initial value i=1.

Next, in step S203, starting from a first frame in the plurality of image frames, an i-th image frame is sequentially acquired. Then, it is determined whether the image frame acquired contains a complete facial feature. This is because that a model that processes the facial feature has certain requirements on a quality of input data. If the face in the image frame is occluded, or the face is greatly deviated from a frontal pose, it is not conducive for the model to process the data.

Next, in step S204, it is determined whether the face is a frontal face based on a face pose detection model. For example, a face key point may be trained by using a Deep Alignment Network (DAN), a Tweaked Convolutional Neural Network (TCNN), etc. The face key point trained may be input into the face pose detection model so as to estimate a pose of the face in the image frame according to the face key point. The face pose detection model may calculate a pitch angle, a yaw angle and a roll angle of the face, and determine whether the face is a frontal face or not or whether a deflection range of the face is within an allowable range or not based on the pitch angle, the yaw angle and the roll angle.

Next, in step S205, in response to determining that the face is the frontal face, it is determined whether the face is occluded or not based on a face occlusion detection model. For example, seetaface's face occlusion model may be used to determine whether the face is occluded or not. Alternatively, lightweight networks such as shuffleNet and mobileNet may also be used to classify and train the frontal face and the occluded face to obtain a face occlusion model so as to determine whether the face is occluded or not.

Next, in step S206, in response to determining that the extracted image frame contains the frontal face that is not occluded, it is determined that the extracted image frame contains a complete facial feature, and the extracted image frame (that is, the i-th image frame) is stored as a frame in a first image frame sequence S1.

Next, in step S207, it is determined whether a predetermined number of image frames are stored in the first image frame sequence S1 or not. Here, the predetermined number of image frames may be determined according to a computing power of a computing device that performs the registration. For example, if the computing device has a strong computing power, the predetermined number of frames may be appropriately increased. For example, the predetermined number of frames may be determined to be 30 or 50 frames or more. If the computing device has a weak computing power, the predetermined number of frames may be determined to be 20 frames or less. The predetermined number of frames may be determined by weighing an authentication accuracy requirement during the registration process, the computing power of the device, and a registration authentication time requirement. If it is determined that the predetermined number of image frames have been stored in the first image frame sequence S1, the process of extracting image frames may end and the first image frame sequence S1 including the predetermined number of image frames is obtained. If it is determined that the predetermined number of image frames have not been stored in the first image frame sequence S1, then in step S208, the loop variable i is increased by 1, that is to say, let i=i+1, and then the process returns to step S203 to continuously acquire the i-th image from the plurality of image frames until the predetermined number of image frames are stored in the first image frame sequence S1.

The first image frame sequence obtained by the method according to the embodiments of the present disclosure may include a plurality of image frames respectively including a complete facial feature, which may be used to determine the action behavior of the face and recognize the facial feature during the registration process.

According to the embodiments of the present disclosure, the determining whether each image frame reaches a preset definition or not according to the relative position of the face detection frame in the image frame may include: determining a first ratio of an area of an intersection region of face detection frames in two image frames in the first image frame sequence to an area of a union region of the face detection frames in the two image frames; and determining that the image frame reaches the preset definition in response to the first ratio determined being greater than a first threshold.

According to another embodiment of the present disclosure, the determining whether each image frame reaches a preset definition or not according to the relative position of the face detection frame in the image frame may include: determining a first ratio of an area of an intersection region of face detection frames in two image frames in the first image frame sequence to an area of a union region of the face detection frames in the two image frames; determining a second ratio of a number of the first ratio greater than the first threshold to a total number of the first ratio; and determining that the image frame reaches the preset definition in response to the second ratio being greater than or equal to a second threshold.

According to the embodiments, the two image frames in the first image frame sequence used to perform the calculation may be adjacent image frames or spaced image frames. For example, let the first image frame sequence S1 include image frames $F_1$, $F_2$, $F_3$, $F_4$, $F_5$, $F_6$ . . . . In the embodiment of calculating the first ratio for adjacent image frames, the first ratio for $F_1$ and $F_2$ may be calculated, the first ratio for $F_2$ and $F_3$ may be calculated, the first ratio for $F_3$ and $F_4$ may be calculated, . . . and so on. In another embodiment of calculating the first ratio for spaced image frames, the calculation may be performed at an interval of one image frame, for example, the first ratio for $F_1$ and $F_3$ may be calculated, the first ratio for $F_3$ and $F_5$ may be calculated, . . . and so on. In yet another embodiment of calculating the first ratio for spaced image frames, the calculation may be performed at an interval of two or more image frames, for example, the first ratio for $F_1$ and $F_4$ may be calculated, . . . and so on.

Figure 3A:
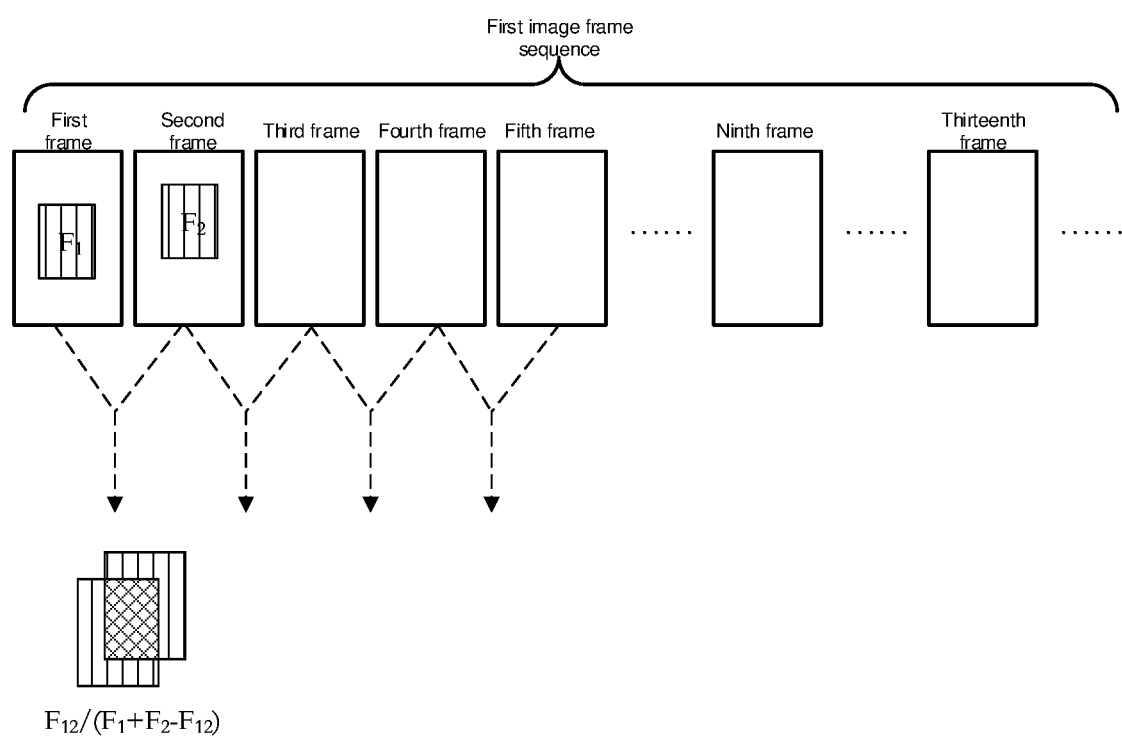
FIG. 3A and FIG. 3B respectively show examples of determining whether an image frame reaches a preset definition or not based on a relative position of a face detection frame according to some embodiments of the present disclosure.
Figure 3B:
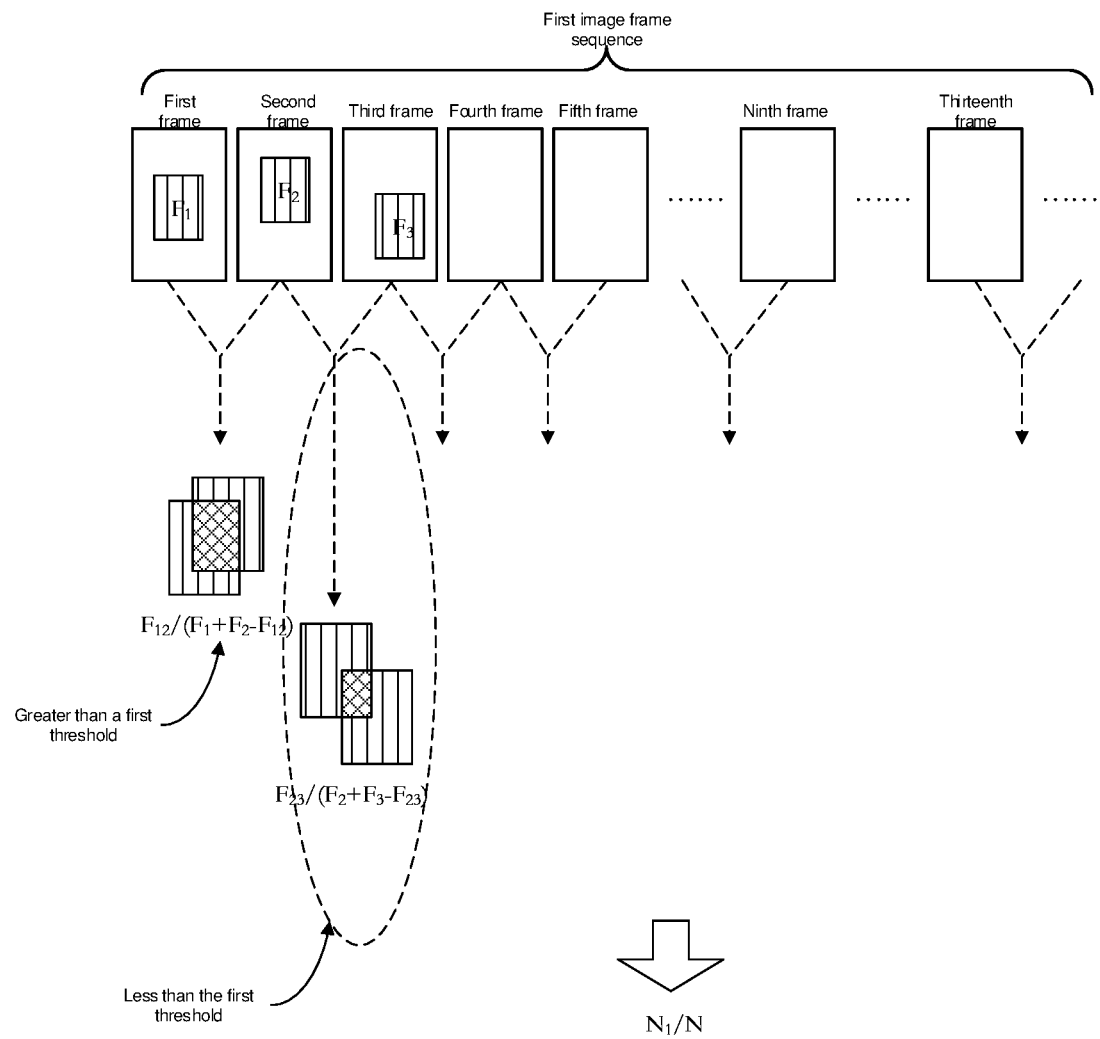

FIG. 3A and FIG. 3B respectively show examples of determining whether the image frame reaches the preset definition or not based on the relative position of the face detection frame according to some embodiments of the present disclosure. In FIG. 3A and FIG. 3B, only a case of calculating the first ratio for adjacent image frames is illustrated by way of example.

As shown in FIG. 3A, the first image frame sequence may include a plurality of image frames, and a ratio of an area of the intersection region of the face detection frames in two image frames to an area of the union region is calculated to determine the action behavior of the object. As shown in FIG. 3A, the ratio of the area of the intersection region of two adjacent face detection frames to the area of the union region may be calculated as $F_{12}/(F_1+F_2-F_{12})$, where $F_1$ represents the face detection frame in a first image frame and further represents an area of the face detection frame $F_1$, $F_2$ represents the face detection frame in a second image frame and further represents an area of the face detection frame $F_2$, and $F_{12}$ represents an area of an intersection region of the face detection frames $F_1$ and $F_2$.

According to the embodiments, a first threshold may be set according to a registration reliability requirement and an image definition requirement. If the first threshold is set to be large, a quality of the image may be improved, that is, it may be ensured that the image is clear, but it may cause multiple registration and authentication. In contrast, if the first threshold is set to be small, the registration and authentication may be performed smoothly, but it is possible to introduce a plurality of unclear images, which may affect the reliability of the registration and authentication. According to the embodiments, the quality of the image may be ensured by adjusting the first threshold.

As shown in FIG. 3B, a process of calculating the ratio of the area of the intersection region of the face detection frames in adjacent image frames to the area of the union region is the same as that shown in FIG. 3A, and $F_{12}/(F_1+F_2-F_{12})$ may be calculated with reference to FIG. 3A. In FIG. 3B, a number $N_1$ of the first ratio greater than the first threshold is counted, and then a second ratio $N_1/N$ of the number $N_1$ of the first ratio greater than the first threshold to a total number N of the first ratio is calculated. If $N_1/N$ is greater than or equal to a second threshold, it is determined that the image frame reaches the preset definition.

In this embodiment, even if the definition of part of the image frames does not reach the preset first threshold, for example, if $F_{23}/(F_2+F_3-F_{23})$ is less than the first threshold, it is not considered that the image frame does not reach the preset definition. According to the embodiments, when the image frame reaching the preset resolution reaches a certain scale, that is, when the ratio of the number $N_1$ of the first ratio greater than the first threshold to the total number N of the first ratio reaches a certain requirement, that is, when the second ratio $N_1/N$ of the number $N^1$ of the first ratio greater than the first threshold to the total number N of the first ratio is greater than or equal to the second threshold, it is considered that the image frame reaches the preset definition. According to the embodiments, the quality of the image may be ensured by adjusting the first threshold and the second threshold in coordination. By introducing two adjustment parameters, whether the image frame reaches the preset definition or not may be determined more flexibly and accurately.

Figure 4:
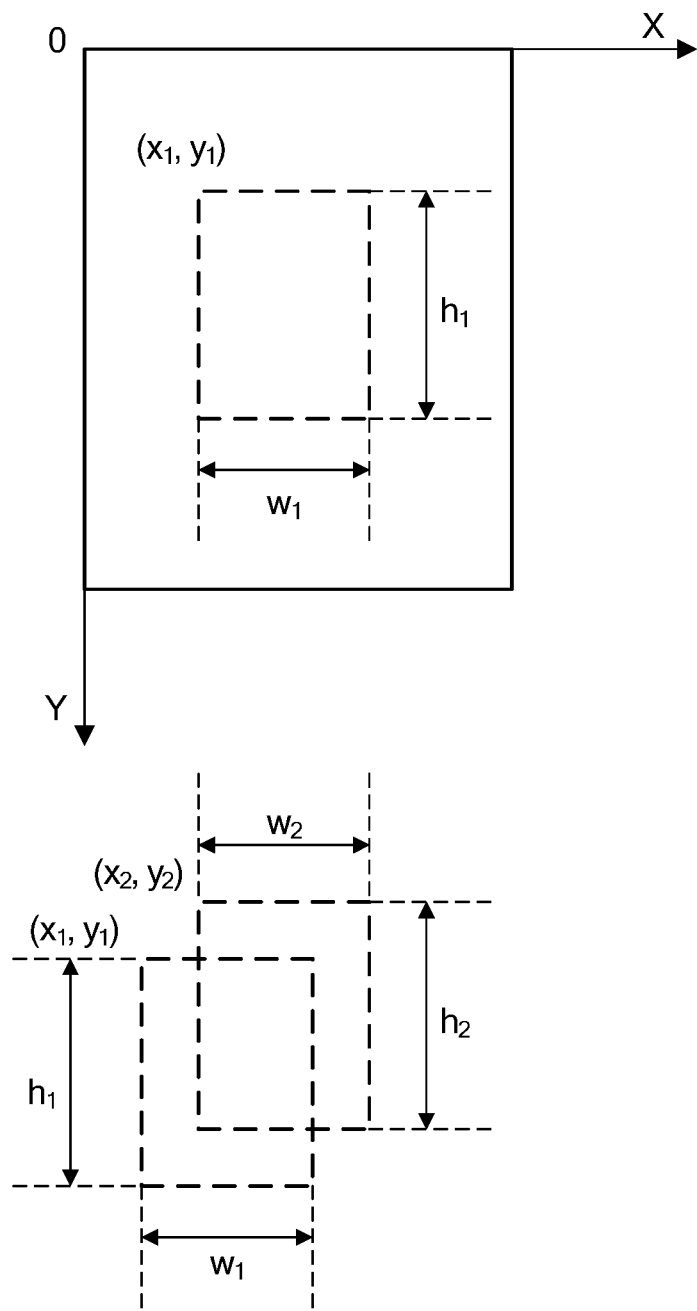
FIG. 4 shows an example of calculating an intersection of face detection frames based on coordinates and sizes of the face detection frames according to some embodiments of the present disclosure.

FIG. 4 shows an example of calculating the intersection of the face detection frames based on coordinates and sizes of the face detection frames according to some embodiments of the present disclosure. As shown in FIG. 4, a coordinate system in an upper part of FIG. 4 is a coordinate system established with an upper left corner point of the image frame as an origin of the coordinates. A positive direction of X-axis is a direction extending along a side of the image frame, and a positive direction of Y-axis is a direction extending along another side of the image frame. As shown in FIG. 4, a parameter set $[x_1, y_1, w_1, h_1]$ may be used to represent a position and a size of the face detection frame in the first image frame, where $x_1$ and $y_1$ represent the coordinates of the upper left corner point of the face detection frame, $w_1$ represents a length of the face detection frame in the X-axis direction, and $h_1$ represents a length of the face detection frame in the Y-axis direction. Shown below the coordinate system is a process of obtaining the intersection of the face detection frame in the first image frame and the face detection frame in the second image frame. As shown in FIG. 4, the coordinates of the upper left corner point of the intersection region may be determined to be $x_{min}=\max(x_1, x_2)$, $y_{min}=\max(y_1,y_2)$, and the coordinates of a lower right corner point of the intersection region may be determined to be $x_{max}=\min(x_1+w_1,x_2+w_2)$, $y_{max}=\min(y_1+h_1,y_2+h_2)$. According to the coordinates of the upper left corner point and the lower right corner point of the intersection area, the area of the intersection region may be calculated as $S_{12}=(x_{max}-x_{min})*(y_{max}-y_{min})$.

According to the embodiments, the determining whether the faces represent an object according to the plurality of sets of facial features may include: determining a similarity between the facial features in any two adjacent image frames in the first image frame sequence, and determining that the faces represent the object in response to the similarity determined being greater than a third threshold; or determining that the faces represent different objects in response to the similarity determined being not greater than the third threshold. In the embodiments of the present disclosure, the facial feature may be acquired by calling the facial feature extraction model. Different facial feature extraction models may output feature vectors of different dimensions. For the feature vector, the similarity between the facial features in any two adjacent image frames in the first image frame sequence may be determined by calculating a distance between the feature vectors. According to the embodiments, Euclidean distance $c=\sqrt{(m_i-n_i)^2}$, Manhattan distance $c=|m_i-n_i|$, or Mahalanobis distance $D_M(m, n)=\sqrt{(m_i-n_i)^T \Sigma^{-1}(m_i-n_i)}$ may be used to calculate the distance between the feature vectors, where $m_i$ and $n_i$ represent vectors. According to the embodiments, the third threshold may be determined according to a database used by the facial feature extraction model adopted. Different facial feature extraction models may give settings of a recognition accuracy and a corresponding threshold. If it is determined through analysis and recognition that the face in each image frame in the first image frame sequence belongs to the object, then a designated image frame in the first image frame sequence may be used as the registration data to register the object.

According to the embodiments, prior to storing the registration data, the registration data may be compared with the registration data previously stored in the face database so as to determine a similarity. If the face is already registered, the storage may not be overwritten.

According to the embodiments of the present disclosure, the registration may be performed by using a video, and the definition of the image frame may be determined by analyzing the relative positions between the face detection frames in the plurality of image frame, without requiring the user to cooperate with the operation such as blinking, opening mouth, etc. In this way, the registration and authentication process may be simplified, and the reliability of the registration data may be ensured.

Figure 5:
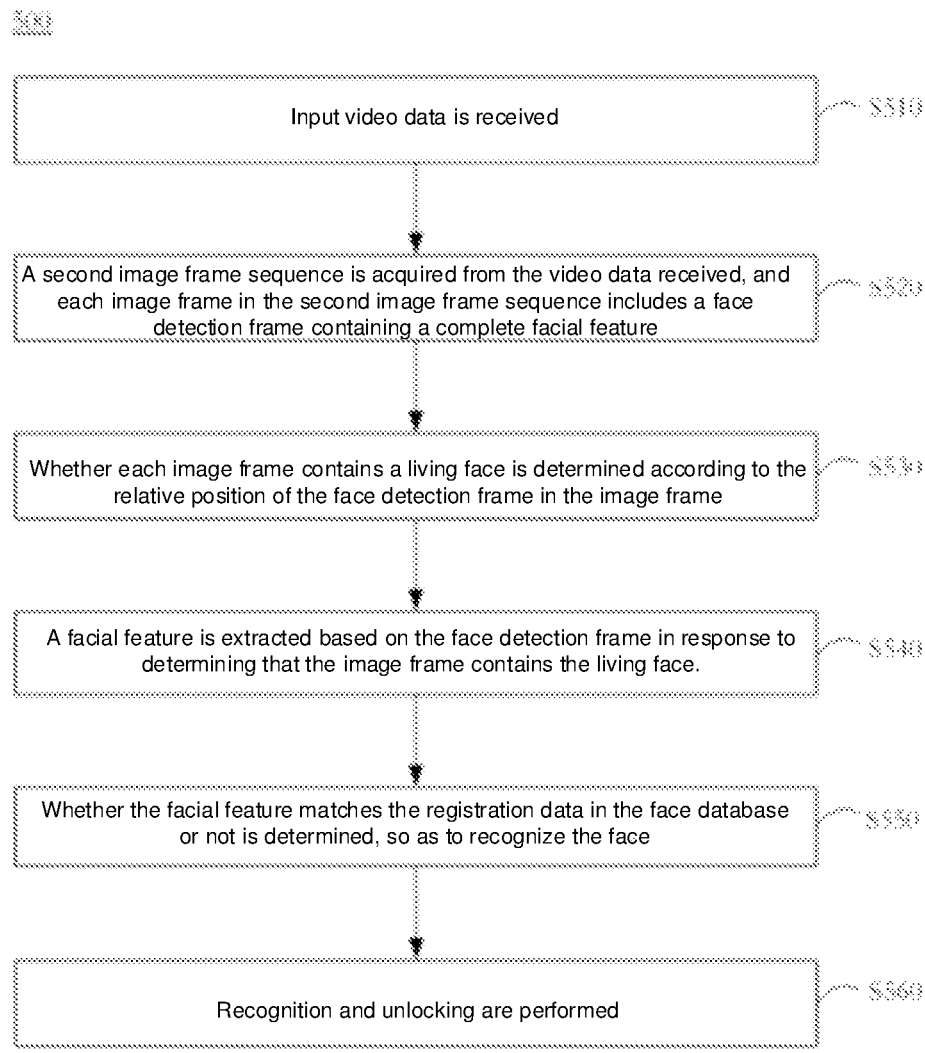
FIG. 5 shows a flowchart of a method of recognizing and unlocking a face in the received video data based on a face database according to some embodiments of the present disclosure.

FIG. 5 shows a flowchart of a method 500 of recognizing and unlocking a face in received video data based on a face database according to some embodiments of the present disclosure. As shown in FIG. 5, the method 500 includes following steps.

In step S510, input video data is received.

In step S520, a second image frame sequence is acquired from the video data received. Each image frame in the second image frame sequence may include a face detection frame containing a complete facial feature.

In step S530, whether each image frame contains a living face is determined according to the relative position of the face detection frame in the image frame.

In step S540, a facial feature is extracted based on the face detection frame in response to determining that the image frame contains the living face.

In step S550, whether the facial feature matches the registration data in the face database or not is determined, so as to recognize the face.

In step S560, the recognition and unlocking are performed.

The operations of steps S510, S520, S540 and S550 may be obtained by referring to steps S110, S120 and S140 in the method 100 of registering the face based on the video data in the embodiments described above, which will not be repeated here.

According to some embodiments, the determining whether each image frame contains a living face or not according to the relative position of the face detection frame in the image frame may include: determining face detection frames meeting a coincidence condition of the plurality of face detection frames in each image frame; determining a third ratio of a number of the face detection frames meeting the coincidence condition to a total number of the plurality of face detection frames; determining that the face is a non-living face in response to the third ratio being greater than or equal to a fourth threshold; and determining that the face is a living face in response to the third ratio being less than the fourth threshold.

According to some embodiments, the determining face detection frames meeting a coincidence condition of the plurality of face detection frames in each image frame may include: determining a fourth ratio of an area of an intersection region of any two face detection frames of the plurality of face detection frames to an area of each face detection frame of the two face detection frames; determining that the two face detection frames are the face detection frames meeting the coincidence condition in response to the fourth ratios determined being both greater than a fifth threshold; and determining that the two face detection frames are not the face detection frames meeting the coincidence condition in response to the fourth ratios determined being both less than the fifth threshold.

In this embodiment, an intersection operation is performed between any two face detection frames of the plurality of face detection frames, and a ratio of the area of the intersection region obtained to each face detection frame of the two face detection frames on which the intersection operation is performed is calculated. A degree of coincidence between the two face detection frames may be determined based on the ratio calculated. According to some embodiments, a fifth threshold is set to measure the degree of coincidence between two face detection frames. If the fifth threshold is set high, the coincidence may be determined only in a case of a high degree of coincidence between the two face detection frames. The coincidence of the face detection frames may indicate a high probability that the object has no action behavior within the time period between the two face detection frames, that is, the object may be considered to be static, and furthermore, the object is considered to be not a living body. Therefore, if the fifth threshold is set high, a proportion of coincident face detection frames in all face detection frames may be reduced, and a possibility of recognizing a non-living body as a living body may increase. In contrast, if the fifth threshold is set low, more face detection frames may be determined to be coincident, so that a possibility of recognizing a living body as a non-living body may increase. In practice, the fifth threshold may be set according to an occasion where the registration authentication is applied. For example, for some occasions where the method of the embodiments of the present disclosure is used to perform an unlocking function, the fifth threshold may be set relatively high, because in these occasions, it may be generally ensured that the object is a living body, and reducing the possibility of recognizing a living body as a non-living body may fully ensure that the living object may be correctly recognized, so as to improve the user experience.

Whether the face is a living face may be determined by analyzing the action behavior of the object. That is, in the embodiments of the present disclosure, whether the object is a living body or not may be determined only by analyzing the relative position of the face detection frame in the plurality of image frames, so as to prevent an unlocking operation based on a non-living body video. For example, the unlocking operation using a photo of the object may be avoided, which may improve a security of locking.

Figure 6:
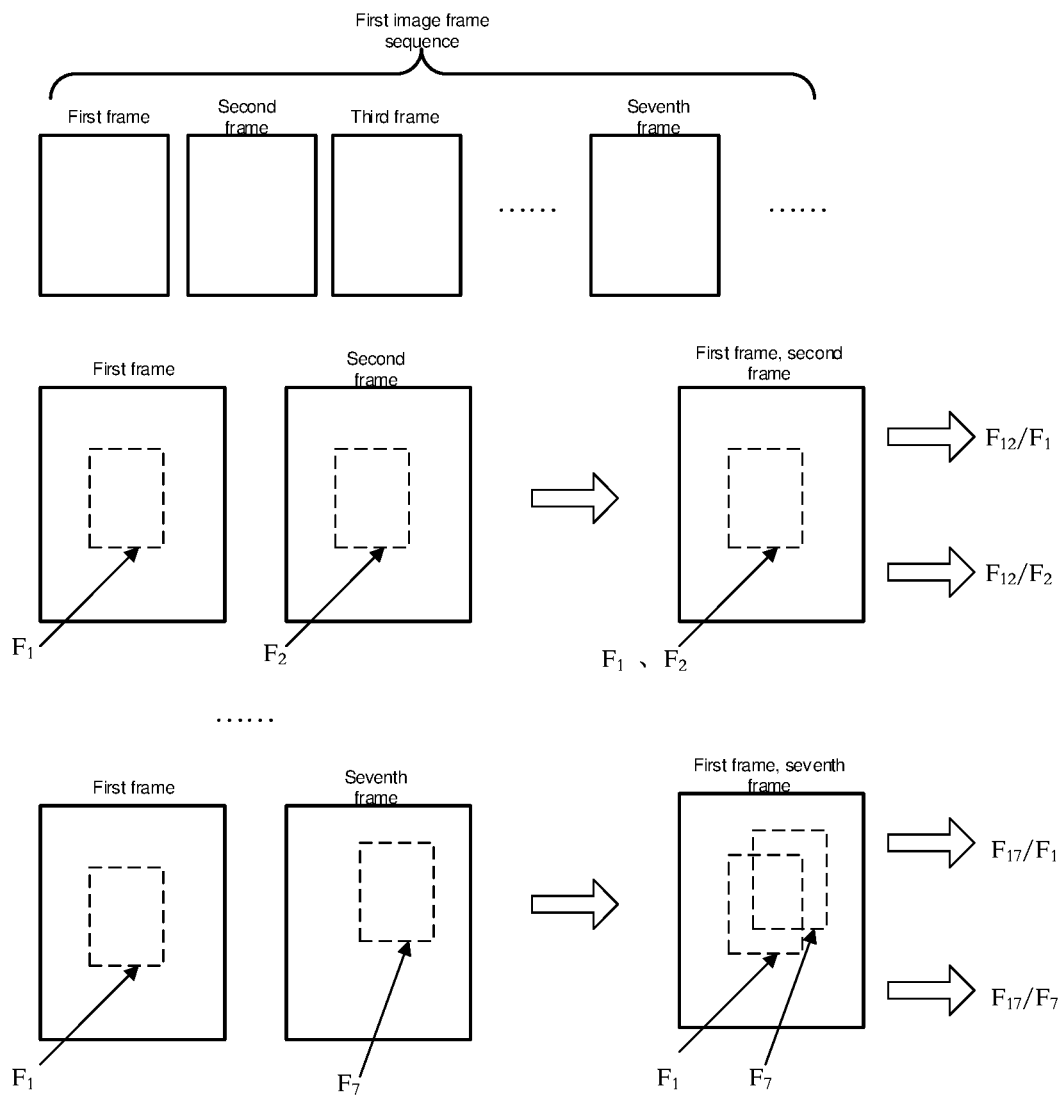
FIG. 6 shows a process of determining face detection frames meeting a coincidence condition of a plurality of face detection frames according to some embodiments of the present disclosure.

FIG. 6 shows a process of determining the face detection frames meeting the coincidence condition of the plurality of face detection frames according to some embodiments of the present disclosure. As shown in FIG. 6, after the intersection region between the face detection frame $F_1$ in the first image frame and the face detection frame $F_2$ in the second image frame is obtained, a fourth ratio $F_{12}/F^1$ of the area of the intersection region $F_{12}$ to the area of the face detection frame $F_1$, and the fourth ratio $F_{12}/F_2$ of the area of the intersection region $F_{12}$ to the area of the face detection frame $F_2$ need to be calculated respectively. Here, $F_1$ and $F_2$ are still used to represent the areas of the face detection frames $F_1$ and $F_2$. Then, a relationship between the fourth ratios $F_{12}/F^1$, $F_{12}/F_2$ and the fifth threshold needs to be compared respectively. Only when the fourth ratios $F_{12}/F^1$ and $F_{12}/F_2$ are both greater than the fifth threshold, it is determined that the face detection frame $F_1$ and the face detection frame $F_2$ meet the coincidence condition. Similarly, the fourth ratios $F_{17}/F_1$ and $F_{17}/F_7$ for the face detection frame $F_1$ and the face detection frame $F_7$ are calculated. If the fourth ratios $F_{17}/F^1$ and $F_{17}/F_7$ are both less than or equal to the fifth threshold, it is determined that the face detection frame $F_1$ and the face detection frame $F_7$ do not meet the coincidence condition.

According to some embodiments, if one of the second ratios is less than or equal to the second threshold and the other of the second ratios is greater than the second threshold, it is determined that the face is a non-living face. This is a special situation caused by a large difference in the sizes of the two face detection frames. As shown in FIG. 6, the face detection frames (for example, $F_1$, $F_2$, $F_7$) are shown to have the same size. In practice, the sizes of the face detection frames may be different from each other, but may not be much different. If the size of a face detection frame is quite different from that of other face detection frames, it means that the face contained in the face detection frame may move in a large range, or the face contained in the face detection frame may not belong to the same person as the face contained in other face detection frames. Therefore, in this case, it may be directly determined that the object is a non-living body according to a result of comparing the fourth ratios and the fifth threshold, and it is not further determined whether other face detection frames meet the coincidence condition.

Figure 7:
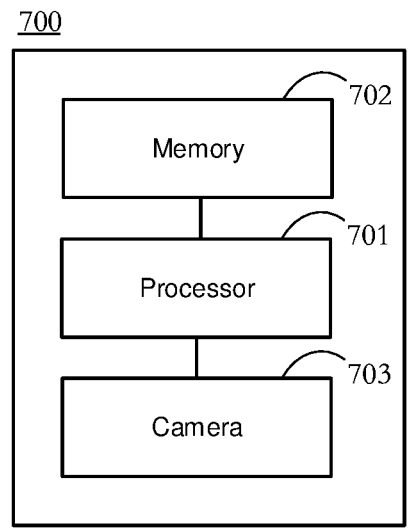
FIG. 7 shows a block diagram of a device of registering a face based on video data according to some embodiments of the present disclosure.

FIG. 7 shows a block diagram of a device 700 of registering a face based on video data according to some embodiments of the present disclosure. As shown in FIG. 7, the device 700 may include a processor 701, a memory 702, and a camera 703. The memory 702 may store machine-readable instructions. The processor 701 may execute the machine-readable instructions to implement the method 100 of registering the face based on the video data according to the embodiments of the present disclosure. The camera 703 may be configured to acquire the video data, and the number of frames of the camera 703 may be in a range of 15 to 25 frames per second.

The memory 702 may have a form of a non-volatile or volatile memory, for example, an electrically erasable programmable read-only memory (EEPROM), a flash memory, and the like.

Various components inside the device 700 according to the embodiments of the present disclosure may be implemented by a variety of devices, including but not limited to: an analog circuit device, a digital circuit device, a digital signal processing (DSP) circuit, a programmable processor, an application specific integrated circuit (ASIC), a field programmable gate array (FPGA), a complex programmable logic device (CPLD), etc.

Figure 8:
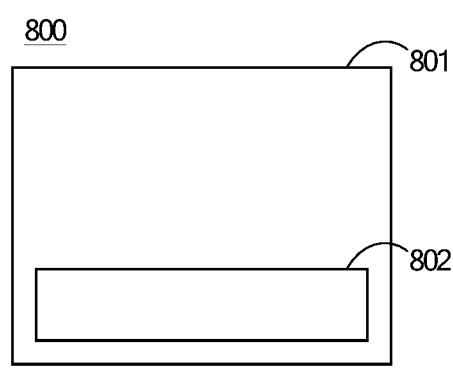
FIG. 8 shows a block diagram of an electronic whiteboard according to some embodiments of the present disclosure.

FIG. 8 shows a block diagram of an electronic whiteboard 800 according to some embodiments of the present disclosure. As shown in FIG. 8, the electronic whiteboard 800 according to the embodiments of the present disclosure may include a display whiteboard 801 and a device 802 of registering a face based on video data according to some embodiments of the present disclosure.

In the electronic whiteboard according to the embodiments of the present disclosure, a device of registering based on video data is installed, and the face may be registered directly by a video stream interception without human interaction. The registration is more convenient by directly acquiring video frames. The electronic whiteboard according to the embodiments of the present disclosure does not need to be turned on and off manually, may be directly unlocked and used through facial information within a certain distance, and has good confidentiality. Moreover, only a fixed face reserved and registered may unlock the electronic whiteboard, so that an information security of the reserved user during the use of the electronic whiteboard may be effectively protected.

The above detailed description has explained a number of embodiments by using schematic diagrams, flowcharts and/or examples. In a case that such schematic diagrams, flowcharts and/or examples contain one or more functions and/or operations, those skilled in the art should understand that each function and/or operation in such schematic diagrams, flowcharts or examples may be implemented individually and/or together through various structures, hardware, software, firmware or substantially any combination of them.

Although the present disclosure has been described with reference to several typical embodiments, it should be understood that the terms used are illustrative and exemplary rather than restrictive. Since the present disclosure may be implemented in various forms without departing from the spirit or essence of the present disclosure, it should be understood that the embodiments described above are not limited to any of the foregoing details, but should be interpreted broadly within the spirit and scope defined by the appended claims. Therefore, all changes and modifications falling within the scope of the claims or their equivalents shall be covered by the appended claims.

What is claimed is:

1. A method of registering a face based on video data, comprising:
receiving video data;
acquiring a first image frame sequence from the video data, wherein each image frame in the first image frame sequence comprises a face detection frame containing a complete facial feature of a face;
determining, according to a relative position of the face detection frame in each image frame, whether the image frame reaches a preset definition or not;
extracting a plurality of sets of facial features based on an image information of a plurality of face detection frames in response to determining that the image frame reaches the preset definition, and determining whether the face represents an object or not according to the plurality of sets of facial features, wherein the object is a person; and
registering the object according to the first image frame sequence in response to determining that the face represents the object;
wherein the registering the object according to the first image frame sequence comprises: registering the object by using a designated image frame in the first image frame sequence as registration data;
wherein the acquiring a first image frame sequence from the video data comprises:
acquiring a plurality of image frames from the video data according to a sequence of capturing a video;
determining whether the plurality of image frames contains a face or not based on a face detection model; and
determining a face detection frame containing the face in each image frame of the plurality of image frames, in response to determining that the image frame contains the face; and
wherein the acquiring a first image frame sequence from the video data further comprises:
determining whether the image frame acquired contains a complete facial feature or not;
storing the image frame as a frame in the first image frame sequence in response to determining that the image frame contains the complete facial feature; and
ending the acquiring of image frames in response to determining that a predetermined number of image frames are stored in the first image frame sequence.

2. The method of claim 1, wherein the determining whether the image frame acquired contains a complete facial feature or not comprises:
determining whether the face is a frontal face based on a face pose detection model;
determining whether the face is occluded or not based on a face occlusion detection model in response to determining that the face contained in the image frame is the frontal face;
determining that the image frame contains the complete facial feature, in response to determining that the face contained in the image frame is not occluded; and
determining that the image frame does not contain the complete facial feature, in response to determining that the face contained in the image frame is occluded.

3. The method of claim 1, wherein the determining, according to a relative position of the face detection frame in each image frame, whether the image frame reaches a preset definition or not comprises:
determining a first ratio of an area of an intersection region of face detection frames in two image frames in the first image frame sequence to an area of a union region of the face detection frames in the two image frames; and
determining that the image frame reaches the preset definition, in response to the first ratio determined being greater than a first threshold.

4. The method of claim 3, wherein the determining whether the faces represent an object or not according to the plurality of sets of facial features comprises:
determining a similarity between facial features in any two adjacent image frames in the first image frame sequence; and
determining that the faces represent the object, in response to the similarity determined being greater than a third threshold.

5. The method of claim 4, wherein the facial feature comprises a facial feature vector, and wherein the determining a similarity between facial features in any two adjacent image frames in the first image frame sequence comprises:
determining a distance between the facial feature vectors in the two adjacent image frames in the first image frame sequence.

6. The method of claim 1, wherein the determining, according to a relative position of the face detection frame in each image frame, whether the image frame reaches a preset definition or not comprises:
- determining a first ratio of an area of an intersection region of face detection frames in two image frames in the first image frame sequence to an area of a union region of the face detection frames in the two image frames;
- determining a second ratio of a number of the first ratio greater than the first threshold to a total number of the first ratio; and
- determining that the image frame reaches the preset definition, in response to the second ratio being greater than or equal to a second threshold.

7. The method of claim 1, further comprising:
- storing the registration data obtained by registering the object according to the first image frame sequence as a face database; and
- recognizing a face in the video data received, based on the face database.

8. The method of claim 7, wherein the recognizing a face in the video data received, based on the face database comprises:
- acquiring a second image frame sequence from the video data received, wherein each image frame in the second image frame sequence comprises a face detection frame containing a complete facial feature;
- determining, according to a relative position of the face detection frame in each image frame, whether the image frame contains a living face or not;
- extracting a facial feature based on the face detection frame in response to determining that the image frame contains the living face; and
- determining whether the facial feature matches the registration data in the face database or not, so as to recognize the face.

9. The method of claim 1, wherein the determining, according to a relative position of the face detection frame in each image frame, whether the image frame contains a living face or not comprises:
- determining face detection frames meeting a coincidence condition of the plurality of face detection frames in each image frame;
- determining a third ratio of a number of the face detection frames meeting the coincidence condition to a total number of the plurality of face detection frames;
- determining that the face is a non-living face in response to the third ratio being greater than or equal to a fourth threshold; and
- determining that the face is a living face in response to the third ratio being less than the fourth threshold.

10. The method of claim 9, wherein the determining face detection frames meeting a coincidence condition of the plurality of face detection frames in each image frame comprises:
- determining a fourth ratio of an area of an intersection region of any two face detection frames of the plurality of face detection frames to an area of each face detection frame of the two face detection frames;
- determining that the two face detection frames are the face detection frames meeting the coincidence condition, in response to the fourth ratios determined being both greater than a fifth threshold; and
- determining that the two face detection frames are not the face detection frames meeting the coincidence condition, in response to the fourth ratios determined being both less than the fifth threshold.

11. The method of claim 10, wherein the determining, according to a relative position of the face detection frame in each image frame, whether the image frame contains a living face or not further comprises:
- determining that the face is a non-living face in response to one of the fourth ratios determined being greater than the fifth threshold and the other of the fourth ratios determined being less than or equal to the fifth threshold.

12. A device of registering a face based on video data, comprising:
- a memory configured to store instructions; and
- a processor configured to execute the instructions so as to perform the method of claim 1.

13. An electronic whiteboard comprising the device of claim 12.

* * * * *